US009580632B2

(12) United States Patent
Masuko et al.

(10) Patent No.: US 9,580,632 B2
(45) Date of Patent: Feb. 28, 2017

(54) ADHESIVE COMPOSITION FOR PROTECTIVE FILM ON PAINTING, AND MANUFACTURING PROCESS THEREOF

(71) Applicant: Kraton Polymers U.S. LLC., Houston, TX (US)

(72) Inventors: Norio Masuko, Ibaraki (JP); Hiroshi Kato, Ibaraki (JP)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 14/647,183

(22) PCT Filed: Nov. 12, 2013

(86) PCT No.: PCT/JP2013/080508
§ 371 (c)(1),
(2) Date: May 26, 2015

(87) PCT Pub. No.: WO2014/087815
PCT Pub. Date: Jun. 12, 2014

(65) Prior Publication Data

US 2015/0322307 A1 Nov. 12, 2015

(30) Foreign Application Priority Data

Dec. 7, 2012 (JP) ................................ 2012-268149

(51) Int. Cl.

| | |
|---|---|
| ***C09J 153/02*** | (2006.01) |
| ***B29B 9/06*** | (2006.01) |
| ***C09J 193/00*** | (2006.01) |
| ***C09J 7/02*** | (2006.01) |
| *B29K 25/00* | (2006.01) |
| *B29K 96/04* | (2006.01) |
| *B29K 105/00* | (2006.01) |

(52) U.S. Cl.
CPC ............ *C09J 153/02* (2013.01); *B29B 9/065* (2013.01); *C09J 7/0221* (2013.01); *C09J 193/00* (2013.01); *B29K 2025/08* (2013.01); *B29K 2096/04* (2013.01); *B29K 2105/0085* (2013.01); *C09J 2201/622* (2013.01); *C09J 2203/306* (2013.01)

(58) Field of Classification Search
None
See application file for complete search history.

(56) References Cited

U.S. PATENT DOCUMENTS 4,656,070 A * 4/1987 Nyberg ................ B29C 61/065 138/141
5,643,676 A * 7/1997 Dobashi .................... C09J 7/02 428/343
5,942,569 A * 8/1999 Simmons ................ C08J 3/124 264/211.13
7,645,507 B2 1/2010 Vermunicht et al.
2005/0197464 A1* 9/2005 Handlin, Jr. .......... C08L 53/025 525/314
2006/0151901 A1* 7/2006 Leffelaar ............ C08F 297/046 264/5
2010/0015442 A1 1/2010 Shimoura et al.
2010/0249313 A1* 9/2010 Okazaki ................ C09J 153/02 524/505
2012/0196996 A1 8/2012 Moctezuma Espiricueto

FOREIGN PATENT DOCUMENTS

CN 101313044 A 11/2008
JP 2001-342448 A 12/2001
JP 2002-167567 A 6/2002
JP 2008-274211 A 11/2008
JP 2009-520042 A 5/2009
JP 2011202146 A 10/2011
JP 2012001630 A 1/2012
WO 2007/126081 A1 11/2007
WO 2010/029773 A1 3/2010

OTHER PUBLICATIONS

English translation of the Written Opinion for corresponding application No. PCT/JP2013/080508.
Supplementary European Search Report for corresponding application No. EP 13 85 9823 mailed Aug. 2, 2016.

* cited by examiner

*Primary Examiner* — Jeffrey Mullis
(74) *Attorney, Agent, or Firm* — Wood, Phillips, Katz, Clark & Mortimer

(57) ABSTRACT

To provide An adhesive composition for a protective film to suppress a surface pollution and adhesive residue on a painting surface.
The adhesive composition comprises: 100 weight parts of given block copolymer, and 1 to 20 weight parts of a given polar tackifier resin compound, wherein the polar tackifier resin compound has a solubility parameter (SP value) of 8.2 to 9.2 calculated by the Small method using Hoy's constant.

28 Claims, 3 Drawing Sheets

ADHESIVE COMPOSITION FOR PROTECTIVE FILM ON PAINTING, AND MANUFACTURING PROCESS THEREOF

TECHNICAL FIELD

The present invention relates to an adhesive composition and a manufacturing process thereof, and especially relates to an adhesive composition for a protective film on a painting and a manufacturing process thereof with preventing a surface pollution on the painting.

BACKGROUND ART

Materials, such as metal and resin plates or boards, often have a coat of paint on their surface in view of their applications. The surface of a painted material or board (hereinafter, referred to as "painting" or "paint coating") may be protected by some means to suppress a damage on the board during a loading or transportation process, or to prevent a degeneration and fading of the painting by light, heat, or moisture.

A painting may be protected by a protection film. There has been various conventional protection films in the art.

Patent Document 1 discloses a covering sheet for protecting a body or parts of an automobile, having a given surface roughness on the outer surface of an adhesion layer.

Patent Document 2 discloses a surface protection film, comprising an adhesive layer comprising a polymer block mainly composed of aromatic alkenyl units; and an aromatic alkenyl-conjugated diene random copolymer block including conjugated diene units and aromatic alkenyl units.

CITATION LIST

Patent Literature

Patent Document 1: Japanese Patent Laid-open No. 2012-001630A
Patent Document 2: Japanese Patent Laid-open No. 2011-202146A

SUMMARY OF INVENTION

Technical Problem

It has been well known in the art that conventional protection films cannot always protect a painting enough.

Painted materials and an apparatus (e.g., a vehicle or automobile) including painted materials are often stored outside or in a warehouse which may also have painted materials thereon. Buildings, ships, and aeroplanes that are naturally used outside may have painted materials that often need cure and protection.

An environment outside or in a warehouse is generally hard for a painting and protection film especially in summer and winter. It has been known that some paintings and protection films are suffered from a severe environment such as high temperature and humidity, and drop in quality. For instance, an adhesive layer of a protection film may disadvantageously increase (build up) its adhesive force, and be deteriorated in quality under a severe environment.

The conventional art disclosed in the prior documents above directs to reduce "adhesive residue" on an adherend object from sheets or films when the sheets or films are removed from the object. It has been known that the conventional protection sheets or films would produce adhesive residue under a severe environment.

Even though the cited patent documents above would direct to reduce adhesive residue, the conventional protection sheets or films cannot terminate adhesive residue under a severe environment.

The present inventors have also noticed that a conventional protection film sometimes causes an issue on a painting under a certain condition. The issue is referred to as a "surface pollution", and is different from the problem of "adhesive residue" above. The "surface pollution" would be due to physical and chemical deformations simultaneously or cooperatively occurred on a painting surface. The physical deformations would depend on the fact that a painting surface and an adhesive layer of a film have different thermal expansions. The chemical deformations would depend on molecular mobility based on chemical interactions between a painting surface and an adhesive layer.

The surface pollution can deform a painting surface, especially a painting surface of an expensive vehicle or automobile which may be under a severe environment, and spoil an appearance of the painting surface. The surface pollution has caused damage to a commercial value of an article which have a painting surface.

FIGS. 1A to 1E will give an outline of a mechanism of the surface pollution. The figures illustrate a case that a protection film including base layer 110 and adhesive layer 112 is applied onto painting surface 102 on substrate 100. Note that the figures are exaggeratedly deformed in the thickness direction to be easy to understand.

FIG. 1A schematically illustrates a cause of physical deformation on a system. When the system is heated from an ambient environment, thermal expansion 120 is occurred in a direction. Painting surface 102 and adhesive layer 112 that are adjacent to each other have different degrees of thermal expansion 120. The difference in thermal expansion produces a stress yielding at points 124, and twist or wrinkle 122 appears on the film. The twisted or wrinkled portion of the film are at least partially separated from surface 102. In addition, if substrate 100 or painting surface 102 itself has a curve or concavity and convexity, a protection film may be deformed by the uneven shape and have twists or wrinkles.

FIG. 1B illustrates a subsequent state of the painting surface of FIG. 1A after the film is partially removed from the painting surface. Surface 102 now has convexities 130 and concavities 132 around the portions that were adjacent to stress yielding points 124. The convexities and concavities may be around 0.1 to 0.5 microns, but such the tiny deformations even severely impair a commercial value of an article in the art.

FIG. 1C schematically illustrates a cause of chemical deformation on a system. To simplify the figures, any physical deformations are omitted in FIGS. 1C to 1E. As noted in detail below, chemical interactions 140 can produce bulges or caves on a portion of surface 102 which was contacted with adhesive layer 112 of a film.

FIGS. 1D and 1E illustrate subsequent states of the painting surface of FIG. 1C after the film is partially removed from the painting surface. To simplify the figures, chemical deformations are only shown at the portion from which the film was removed. FIG. 1D shows cave 150 made by a chemical interaction on a portion of surface 102 which contacted with adhesive layer 112. Additional line 152 roughly gives a sign where adhesive layer 112 was attached to FIG. 1E illustrates bulge 154 made by another chemical interaction under a different condition from FIG. 1D on a portion of surface 102 which contacted with adhesive layer 112. Cave 150 and bulge 154 may have a height of 0.1 to 0.5 microns with respect to the original height of surface 102, and can severely damage the article in quality.

It has been desired in the art a novel adhesive composition, a novel surface protection film having the adhesive composition, and a manufacturing process thereof to solve the serious problems of adhesive residue and surface pollution above, without excessive production and running costs.

Solution to Problem

The present inventors have studied the problems and finally developed the present invention.

An embodiment may provide an adhesive composition for a protective film on a painting, comprising:

100 weight parts of block copolymer having the formula of S-EB-S or $(S\text{-}EB)_nX$; and 1 to 20 weight parts of a polar tackifier resin compound, wherein the adhesive composition is substantially free of a plasticizer oil, wherein each S of the formula is independently a polymer block of predominantly styrene, EB is a hydrogenated polymer block of predominantly butadiene, n is an integer equal to or greater than 2, and X is the residue of a coupling agent, wherein the block copolymer includes 13 to 21 wt % of poly(styrene) content, wherein the EB block of the block copolymer has hydrogenation degree of at least 80%, wherein the poly(butadiene) block precursor of the block copolymer has a vinyl content in the range of from 60 to 85 mol %, wherein the polar tackifier resin compound has a solubility parameter (SP value) of 8.2 to 9.2 calculated by the Small method using Hoy's constant, and wherein the tackifier resin compound has a softening point equal to or greater than 110° C. (degree C.) as determined by the Ring and Ball method (ASTM E-28).

Another embodiment may provide a protective film configured to stick on a painting, comprising:

a base layer; and an adhesive layer including an adhesive composition, the adhesive composition including:

100 weight parts of block copolymer having the formula of S-EB-S or $(S\text{-}EB)_nX$; and 1 to 20 weight parts of a polar tackifier resin compound, wherein the adhesive composition is substantially free of a plasticizer oil, wherein each S of the formula is independently a polymer block of predominantly styrene, EB is a hydrogenated polymer block of predominantly butadiene, n is an integer equal to or greater than 2, and X is the residue of a coupling agent, wherein the block copolymer includes 13 to 21 wt % of poly(styrene) content, wherein the EB block of the block copolymer has hydrogenation degree of at least 80%, wherein the poly(butadiene) block precursor of the block copolymer has a vinyl content in the range of from 60 to 85 mol %, wherein the polar tackifier resin compound has a solubility parameter (SP value) of 8.2 to 9.2 calculated by the Small method using Hoy's constant, and wherein the tackifier resin compound has a softening point equal to or greater than 110° C. as determined by the Ring and Ball method (ASTM E-28). In one aspect of the embodiment, the film may be prepared by a co-extrusion or solvent coating.

An embodiment may provide a process for manufacturing an adhesive composition in a form of pellet for a protective film on a painting, the process comprising the steps of:

dry-blending 100 weight parts of a block copolymer having the formula of S-EB-S or $(S\text{-}EB)_nX$ with 1 to 20 weight parts of a polar tackifier resin compound to obtain a dry-blend without substantially using a plasticizer oil;

extruding the dry-blend in an extruder to obtain an extrudate;

pelletizing the extrudate with an underwater pelletizer to obtain wet pellets; and drying the wet pellets to obtain pellets containing the adhesive composition, wherein the adhesive composition is substantially free of a plasticizer oil, wherein each S of the formula is independently a polymer block of predominantly styrene, EB is a hydrogenated polymer block of predominantly butadiene, n is an integer equal to or greater than 2, and X is the residue of a coupling agent, wherein the block copolymer includes 13 to 21 wt % of poly(styrene) content, wherein the EB block of the block copolymer has hydrogenation degree of at least 80%, wherein the poly(butadiene) block precursor of the block copolymer has a vinyl content in the range of from 60 to 85 mol %, wherein the polar tackifier resin compound has a solubility parameter (SP value) of 8.2 to 9.2 calculated by the Small method using Hoy's constant, and wherein the tackifier resin compound has a softening point equal to or greater than 110° C. as determined by the Ring and Ball method (ASTM E-28).

An embodiment may provide a use of the adhesive composition for preventing a surface pollution on a painting, the use comprising the steps of:

providing an article having a painting;

providing a sheet having a base layer;

forming an adhesive layer on the base layer by applying on the base layer the adhesive composition; and pasting the sheet onto the painting. In one aspect of the embodiment, a surface pollution may be prevented for at least seven days at 70° C.

Advantageous Effects of Invention

An adhesive composition or a surface protection film including the adhesive composition can solve the serious problems such as adhesive residue and surface pollution on a painting surface without excessive production and running costs.

DESCRIPTION OF EMBODIMENTS

Figure 1A:
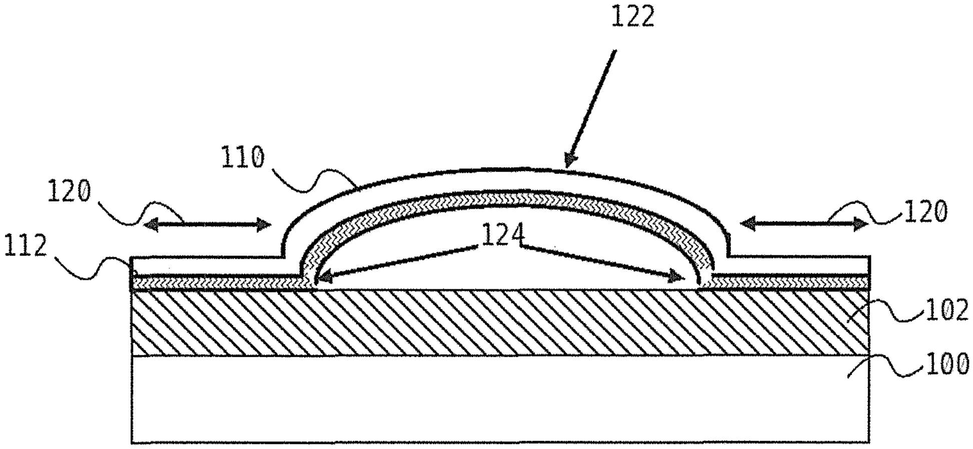
FIG. 1A schematically shows a cause of physical deformations to produce a surface pollution on a painting surface.

Embodiments of the present invention will be explained in detail, but the present invention is not limited to the embodiments.

DEFINITIONS

The term of "material" means in the present specification that a bulk of one or more substances typically used in the art, which may have any shapes and a surface thereon. Material may be referred to as plate, board, square timber or the like depending on its shape.

The term of "painting surface", "painting", or "coating" means a painted surface of a material for a certain convenience. Materials may be painted by any suitable paint compounds in the art, for instance, a coating for a vehicle. The paint may include, but not limited to, acrylic melamines, alkyd melamines, polyesters, phthalic acid resins, epoxy resins, vinyl resins, thinners, lacquers, or urethanes. The paint compounds may also include, but not limited to, any suitable additives such as pigments such as color pigments, extender pigments, anticorrosive pigments, and functional pigments (e.g., phthalocyanine green, titanium, iron blue, iron oxide, lead suboxide, and zinc sulfide); surfactants; gelling agents; biocides; or UV absorbants.

The term of "substrate" means a material under a painting surface or coating. A substrate may include any known materials in the art. A substrate may include, but not limited to, metals or alloys thereof (e.g., iron, steel, stainless steel (SUS), copper, silver, tin, nickel, chrome, aluminium, and molybdenum); plastics (e.g., acrylate, polycarbonate, epoxys, polyvinyl chloride, polyethylene terephthalate (PET), polypropylene, silicone, and polyfluorinated resins); glasses; ceramics; or carbon fibers. A substrate may be planar or curved, and a painting surface thereon may also be planar or curved depending on the shape of the substrate. An article having the substrate may include, but not limited to, automobiles or vehicles, optical components, machines, apparatuses, computers, plates, ships, aeroplanes, buildings, walls, or parts thereof.

The term of "protection film" means a film to be applied onto the surface of a material to protect the surface. Protection films may be prepared by known techniques in the art such as co-extrusion and solvent coating processes. Note that the word of "film" should not be limited to a typical thin membrane, since a film in the art may include any thickness.

The term of "surface pollution" means in the present specification a change in an appearance of a painting surface on which a protection film is applied. The surface pollution may be caused by a physical deformation, chemical deformation, or the both on a painting surface and protection film.

The term of "adhesive residue" means in the present specification a phenomenon that at least a part of adhesives are left on an adherend object when a protection film having the adhesives are removed from the object. Note that again the "adhesive residue" is clearly distinguished from the "surface pollution" in the present specification. The degree of the adhesive residue may be evaluated by measuring a cohesive force of an adhesive itself, or calculating the ratio of an initial adhesion strength and an adhesion strength after an exposure to an environment.

Having a polarity in a molecule means that the molecule has an electronic bias therethrough. Specifically, a polarity may be determined from a solubility parameter or SP value of a molecule.

The term of "solubility parameter" or "SP value (δ; delta)" means in the present specification a parameter determined from Hildebrand's regular solution theory. The SP value can correspond to activities of ingredients in a binary or multi-component system. Unless otherwise noted, a SP value in the present specification is calculated by the Small method using Hoy's constant. In summary, SP value δ $[(cal/ml)^{1/2}]$ should be calculated from formula [1] below.

$$\delta = d^*(\Sigma G)/M \quad [1]$$

where d is density [g/ml]; G is Hoy's molecular attractive force constant of functional groups $[(cal\cdot ml)^{1/2}/mol]$; and M is molecular weight [g/mol]. The calculation is further illustrated in detail in the publications in the art such that K. L. Hoy, New values of the solubility parameters from vapor pressure data, J. Paint Techn., Vol. 42, No. 541, p. 76 (1970); K. L. Hoy, The Hoy tables of solubility parameters, Union Carbide Corp., 1985; K. L. Hoy, Solubility Parameters as a design parameter for water borne polymers and coatings. Preprints 14th Int. Conf. Athene, 1988.; K. L. Hoy, J. Coated Fabrics, 19, p. 53 (1989), which disclosure is incorporated by reference.

The term of "tackifier resin compound" means a resin compound which can work as a tackifier. More specifically, the tackifier resin compound is a resin compound which may be used to prepare an adhesive layer or add an adhesion with an adhesive layer in the art. A tackifier resin compound may include, but not limited to, terpenoid or a derivative thereof, or an aliphatic compound such as an aliphatic cyclic compound. The terpenoid or a derivative thereof may include, but not limited to, terpene resin, terpene phenol resin, terpene phenol resin hydride, hydrogenated terpene resin, and aromatic-modified terpene resin.

The term of "cyclic compound" means a compound having one or more ring structures in its molecule. The cyclic compound may include an aliphatic or aromatic ring structure.

The term of "aliphatic cyclic compound" means a cyclic compound which has an aliphatic structure. The aliphatic cyclic compound may include, but not limited to, an aliphatic cyclic saturated hydrocarbon compound, an aliphatic cyclic partially-saturated hydrocarbon compound, or an aliphatic cyclic non-saturated hydrocarbon compound.

As used herein, unless otherwise noted, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also known as apparent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights". When expressed as apparent molecular weights they are similarly determined, with the exception that consideration of the block copolymer composition and the subsequent conversion to true molecular weights is not done.

The term of "vinyl content" refers to the amount of a conjugated diene which is polymerized via 1,2-addition (in the case of butadiene-it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The result of the addition above, a pendant vinyl group on the polymer skeleton will be produced. The vinyl content in a polymer may be measured using a conventional technique in the art such as proton NMR.

The term "vinyl" refers to the presence of a pendant vinyl group on the polymer chain. When referring to the use of butadiene as the conjugated diene, it may be preferred that about 20 to about 80 mol percent of the condensed butadiene units in the copolymer block have 1,2-vinyl configuration as determined by proton NMR analysis, more preferably about 30 to about 70 mol percent of the condensed butadiene units should have 1,2-vinyl configuration.

This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re 27,145, which disclosure is incorporated by reference.

The term of "plasticizer oil" or "plasticizer" means a (oil-based) compound known as an additive for changing properties of a material in the art. The plasticizer may include, but not limited to, paraffin oil, mineral oil, ester oil, hydrocarbon-based synthetic lubricating oils, naphthenic oils, and vegetable oils.

The term of "softening point" means in the present specification, unless otherwise noted, a softening point determined by the Ring and Ball method (ASTM E-28).

The words of "comprising", "including", and "containing" means in the present specification, unless otherwise noted, that an article or component connotes or has an element(s). The spirit of the words may embraces both an internal and external additions.

<Block Copolymers>

In an embodiment of the present invention, an adhesive composition may comprise a block copolymer having the formula of S-EB-S or $(S\text{-}EB)_nX$, wherein the block copolymer includes 13 to 21 wt % of poly(styrene) content, preferably 13 to 18 wt % of poly(styrene) content. In the case that block copolymer has less than 13 wt % of poly (styrene) content, the cohesive force of polymer is too low and the issue of adhesive residue will appear. If the block copolymer has more than 21 wt % of poly(styrene) content, the adhesive composition itself will be hardened and adhesion force will be disadvantageously decreased. As mentioned above, each S of the formula is independently a polymer block of predominantly styrene, EB is a hydrogenated polymer block of predominantly butadiene, n is an integer equal to or greater than 2, and X is the residue of a coupling agent.

The block copolymer may have poly(styrene) end block content of 13 to 21 wt %, more preferably 13 to 18 wt %. Otherwise the block copolymer or adhesive composition will have a similar issue as noted above.

The block copolymer may have a nominal molecular weight of 100,000 g/mol or more as styrene equivalent peak molecular weight according to ASTM 3536, preferably 110,000 g/mol to 300,000 g/mol, more preferably 120,000 g/mol to 250,000 g/mol. In the case that the nominal molecular weight is less than 100,000 g/mol, a co-extrusion process may lead to a poor film formation, or a film may have the issue of adhesive residue.

The poly(styrene) end block of the block copolymer may have a (nominal) molecular weight of 5,000 g/mol or more as styrene equivalent peak molecular weight according to ASTM 3536, preferably 5,000 g/mol to 12,000 g/mol, more preferably 5,500 g/mol to 10,500 g/mol. In the case that the molecular weight is less than 5,000 g/mol, a protection film will have the same issues noted above.

The EB block of the block copolymer may have hydrogenation degree of at least 80%, preferably at least 90%, more preferably at least 99%. If the hydrogenation degree is less than 80%, the polymer has an inferior heat stability and will be deteriorated.

The poly(butadiene) block precursor of the block copolymer may have a vinyl content in the range of from 60 to 85 mol %, preferably 70 to 85 mol %, more preferably 75 to 85 mol %. If the vinyl content is less than 60 mol %, the initial adhesion strength of an adhesive composition will be insufficient since the tackiness and adhesion strength of block copolymer should be out of balance. If the vinyl content is more than 85 mol %, the adhesive composition should have an insufficient adhesion force under lower temperature.

The coupling efficiency of the block copolymer may preferably be 95% or more.

The block copolymer may be prepared by a known process such as shown in WO03064527 and WO03064528 whose disclosures are incorporated by reference.

The block copolymer may be prepared from any vinyl aromatic hydrocarbons as the S block. The vinyl aromatic hydrocarbons may include, but not limited to, styrene, o-methylstyrene, p-methylstyrene, p-tert-butylstyrene, 2,4-dimethylstyrene, alpha-methylstyrene, vinyl naphthalene, vinyl toluene, vinyl xylene, or mixtures thereof. Preferred one may be styrene.

The block copolymer may be prepared from any polybutadiene monomers as the EB block, containing a substantial pure monomer, or 10 weight percents or less of a conjugated diene which structurally relates to the pure monomer. It may be preferred to use pure butadiene.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred. The amount of modifier utilized will depend on the exact modifier being used. In general, the modifier will be added in an amount from about 50 to about 5000 parts per million (ppm) basis solvent.

In another embodiment, the EB block of the block copolymer may have two or more segments or blocks containing different vinyl contents. In order to achieve the two segments or blocks of polybutadiene having differing 1,2- addition configurations as in the block copolymer, for instance, the first dose of butadiene may be added without the addition of modifier and allowed to polymerize to prepare the first segment. After the generation of the first segment, additional butadiene may be added along with a sufficient quantity of the modifier to achieve the second polybutadiene block having a higher vinyl content.

In still another embodiment, the EB block of the block copolymer may have tapered (with the vinyl content gradually increasing throughout the entity or a part of the block). In order to achieve the block of polybutadiene having a tapered vinyl content of less than 15 mol percent at the first end adjacent to the monovinylaromatic block to a vinyl content that is greater than 25 mol percent at the second end which is furthest from the monovinylaromatic block as in the block copolymer, the butadiene may be added to the reaction vessel and then the modifier to be used may be gradually added in a controlled manner in order to give the tapered vinyl content. The amount of modifier utilized will depend on the exact modifier being used. In general, the modifier will be added in an amount from about 50 to about 5000 parts per million basis solvent.

<Tackifiers>

In an embodiment, the adhesive composition may include, with respect to 100 weight parts of the block copolymer, 1 to 20 weight parts of the polar tackifier resin compound, preferably 1 to 15 weight parts, more preferably 1 to 10 weight parts, still more preferably 1 to 5 weight parts. In the case that the tackifier is more than 20 weight parts, the adhesion strength of the adhesive compound will become too large time-dependently, and the issue of adhesive residue or surface pollution cannot be solved. If the amount of tackifier is less than 1 weight part, especially less than 0.1 weight part, the initial adhesion strength of the adhesive compound would be insufficient.

The polar tackifier resin compound may have a solubility parameter (hereinafter, referred to "SP value") of 8.2 to 9.2 calculated by the Small method using Hoy's constant, preferably 8.5 to 9.1, more preferably 8.8 to 9.1. In the case that SP value is less than 8.2, the adhesive compound will have an insufficient adhesion strength against an adherend object. If the SP value is more than 9.2, the tackifier will have an insufficient compatibility with the block copolymer such that the adhesive composition cannot enoughly support the tackifier or the issue of adhesive residue or surface pollution cannot be solved.

Without wishing to be bound by theory, the relation of the SP value of the tackifier and the surprising effect of the embodiments of the present invention can be considered as follows. With regard to chemical interactions between the adhesive compound and paint substance, if the SP value of the tackifier included in the adhesive is less than 8.2, the tackifier would have a greater compatibility with the EB block of block copolymer (SP value: about 7.8), leading to significant transport suppression of the tackifier into the painting layer. The transportation of the paint substance into the adhesive layer is now dominant such that the painting layer will get thinner.

Figure 1B:
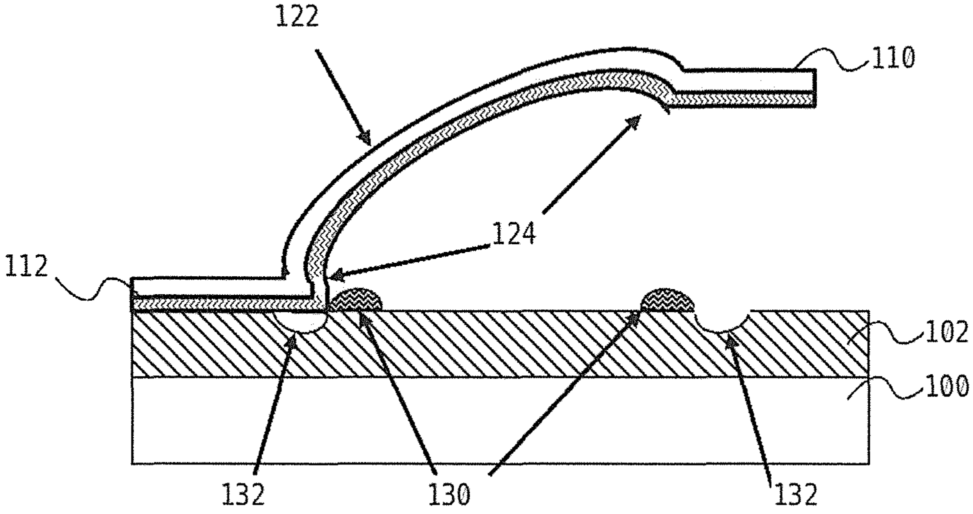
FIG. 1B shows a subsequent state of the painting surface of FIG. 1A after the film is removed from the painting surface.
Figure 1C:
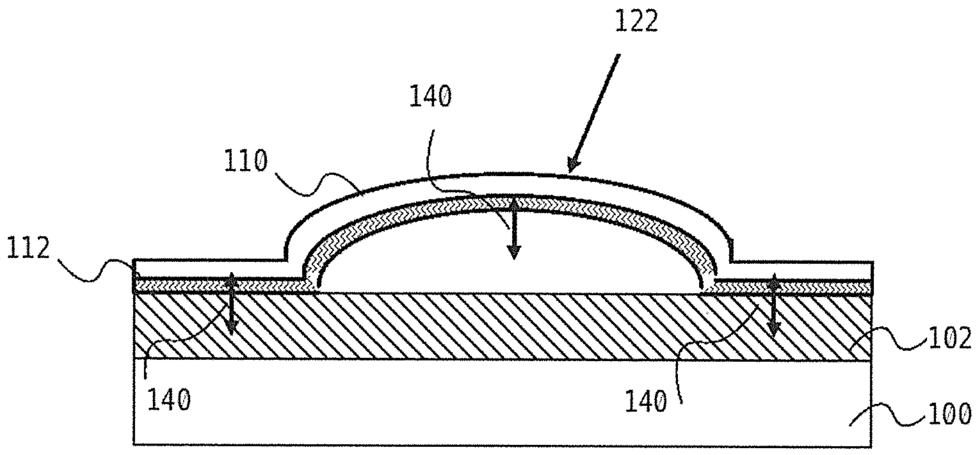
FIG. 1C schematically shows a cause of chemical deformations to produce a surface pollution on a painting surface.
Figure 1D:
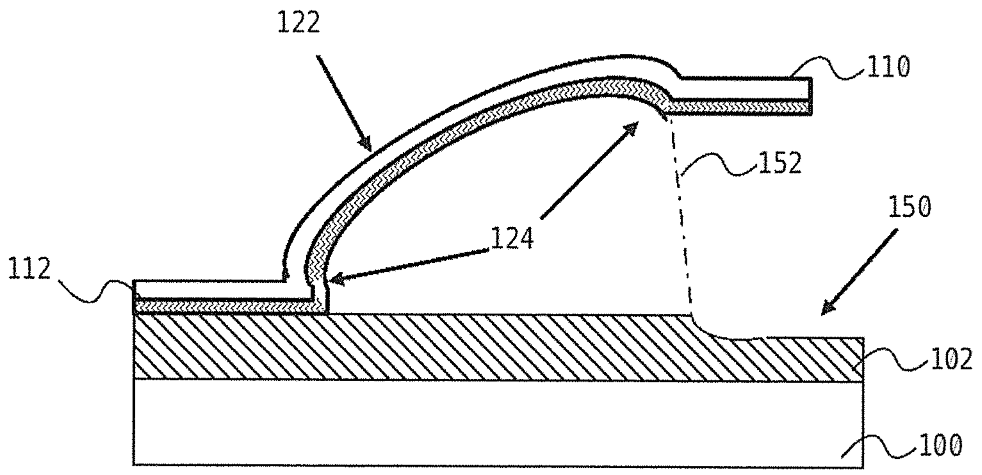
FIG. 1D shows a subsequent state of the painting surface of FIG. 1C after the film is removed from the painting surface.
Figure 1E:
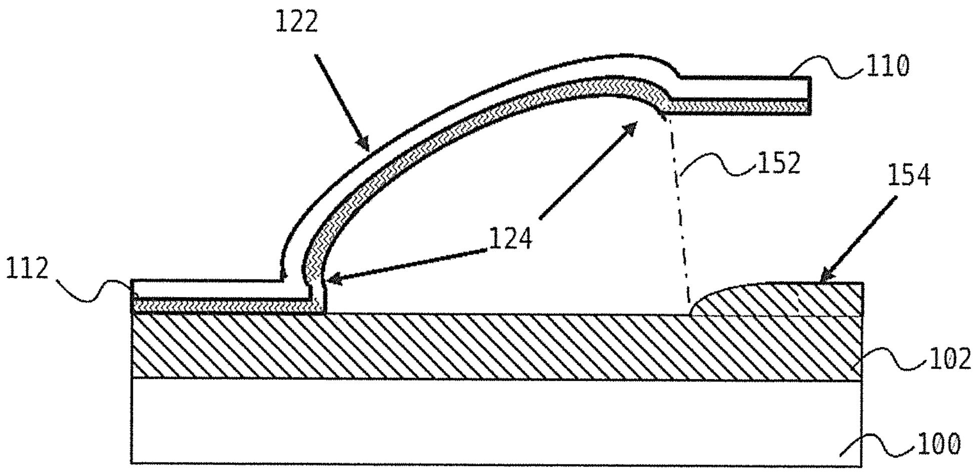
FIG. 1E shows another subsequent state of the painting surface of FIG. 1C after the film is removed from the painting surface.

In contrast, in the case that the SP value of the tackifier is greater than 9.2, the tackifier would have an insufficient compatibility with the block copolymer, and the difference between the SP values of the tackifier and paint substance. A typical paint substance, such as acrylate/melamine-based or polyester-based substance, has around 9.3 to 10.7 of SP value. The transportation of the tackifier into the painting layer is now dominant such that the painting layer will get thicker. Again, FIGS. 1A to 1E should be referenced to understand the phenomena.

In the case that the SP value of the tackifier is in the range of 8.2 to 9.2, the transportations from the adhesive and painting layers is in balance such that the painting layer get neither thinner nor thicker. It is why the range of SP value is surprisingly effective to prevent the surface pollution.

The tackifier resin compound may have a softening point equal to or greater than 110° C., preferably 130° C. or more. If the softening point is less than 110° C., an initial adhesion strength of an adhesive may be disadvantageously lowered.

The tackifier resin compound may be cyclic, or have an aromatic moiety, or be terpenoid or a derivative thereof.

The tackifier resin compound may be selected from, but not limited to, the group consisting of terpene resin, terpene phenol resin, terpene phenol resin hydride, hydrogenated terpene resin, aromatic-modified terpene resin, aliphatic cyclic compound, and aliphatic cyclic partially-saturated hydrocarbon compounds. In an embodiment of the present invention, the tackifier may include, but not limited to, YS Polyster G150 (terpene phenol resin manufactured by Yasuhara Chemical), YS Polyster S145 (terpene phenol resin manufactured by Yasuhara Chemical), YS Polyster T160 (terpene phenol resin manufactured by Yasuhara Chemical), YS Resin TO125 (aromatic-modified terpene resin manufactured by Yasuhara Chemical), YS Resin PX1150N (terpene resin manufactured by Yasuhara Chemical), YS Polyster TH130 (terpene phenol resin manufactured by Yasuhara Chemical), Arkon M135 (aliphatic cyclic partially-saturated hydrocarbon resin compound manufactured by Arakawa Chemical), Arkon P125 (aliphatic cyclic saturated hydrocarbon resin compound manufactured by Arakawa Chemical), and REGALITE R1125 (aliphatic cyclic saturated hydrocarbon resin compound manufactured by Eastman).

The tackifier resin compound may include other tackifiers known in the art such as rosin ester. Note that the properties and the amount of impurities of the other tackifiers shall be taken into consideration.

<Other Ingredients that May be Contained in the Adhesive Composition>

In one embodiment, the adhesive composition may include any ingredients known in the art as an additives for an adhesive composition, as long as the composition can exert the desired effect. The additional ingredients may include, but not limited to, antioxidants, e.g., monophenol, bisphenol, polyphenol, sulfur, phosphorus-based compounds such as Irganox 1010 and Irgafos 168 manufactured by BASF; reducing agents; oxygen scavengers; light stabilizers; antacids; pH stabilizers; surface treatment agent; heat stabilizers; colorants; fillers, e.g., talc, calcium carbonate, and carbon black; surfactants; gelling agents; biocides; UV absorbants, e.g., salicylic acid, benzophenone, benzotriazole, cyanoacrylate, and hindered amine; anti-blocking agents, e.g., polyolefin such as polyethylene, silica, talc, calcium carbonate powder, and Acumist B-18 manufactured by Honewell; flame retardants; or polyphosphoric acid. The adhesive composition may preferably include up to 5 weight parts, more preferably up to 1 weight part, still more preferably up to 0.5 weight part of an antioxidant with respect to 100 weight parts of block copolymer.

In one embodiment, the adhesive compound may not substantially contain any plasticizer oils. A plasticizer oil generally tends to produce a stain on a painting surface, and the adhesive composition may be preferably free of any plasticizer oil. Note that the phrases of "substantially free" and "not substantially contain" or the like should not exclude an inevitable trace amount of a plasticizer which may be mixed in a production plant or materials.

The adhesive composition may be prepared in the form of pellets. In order to prepare pellets, the following procedure may be carried out: dry-blending the given block copolymer with the given polar tackifier resin compound to obtain a dry-blend without substantially using a plasticizer oil; extruding the dry-blend in an extruder to obtain an extrudate; pelletizing the extrudate with an underwater pelletizer to obtain wet pellets; and drying the wet pellets to obtain pellets containing the adhesive composition.

The wet or dry pellets may be treated with a dusting agent in an amount of 0.1 to 10% by weight of the total composition. In the process for producing pellets with an underwater pelletizer it has been found advantageous to add an antifoaming agent and a detergent to the pelletizer water to avoid agglomeration of the pellets.

<Base Layer of Protection Film>

An embodiment may provide a protection film comprising the adhesive composition. The film may be configured to locate on a painting surface, and may include a base layer and an adhesive layer containing the adhesive composition. The base layer mainly acts as a support for the adhesive layer.

The base layer may include any suitable materials in the art. The base layer may include, but not limited to, polyolefin resins, e.g., polyethylene, low density polyethylene, medium density polyethylene, high density polyethylene, polypropylene, and polyethylene terephthalate; ethylene-alpha-olefin copolymers; vinyl acetate copolymers; ethylene-methyl methacrylate copolymers; ethylene-n-butyl acrylate copolymer; polyamides; polyacetals; polyurethanes; polyvinyl chloride; polystyrene; and polycarbonate, or the mixture thereof.

The thickness of the base layer may not be limited. The thickness of the base layer may, for instance, be 1 mm or less, 100 microns or less, 10 microns or less, or 1 micron or less. The thickness of the base layer may be preferably optimized depending on the shape of the painting surface to which the film is applied.

The base layer may be transparent, semi-transparent, or colored with any suitable colorants. The base layer may be moisture permeable, semi-permeable, or non-permeable, or porous or non-porous depending on a use of the film. The wavelength range which the base layer absorbs may be preferably be adjusted by a known technique in the art.

<Adhesive Layer of the Protection Film>

In one embodiment, the adhesive layer of the film may be composed of the adhesive composition, or may include any combination of the adhesive composition and any other suitable ingredients. The other ingredients may include block copolymers other than the aforesaid block copolymer.

In order to achieve the objective above, the adhesive composition may comprise 100 weight parts of the combination of the first and second block copolymers; and 1 to 20 weight parts of the tackifier, as another approach. The second block copolymers may be added to control formability or other properties of the composition.

The first block copolymer may be the aforesaid block copolymer having the formula of S-EB-S or $(S\text{-}EB)_nX$.

The second block copolymer may include, but not limited to, hydrogenated block copolymer having one or more formulae of A-B-A, $(A\text{-}B)_n$, $(A\text{-}B\text{-}A)_nX$, and $(A\text{-}B)_nX$, wherein each block A is a polymer block of one or more mono alkenyl arenes having a molecular weight between 3,000 and 60,000 as styrene equivalent peak molecular weight according to ASTM 3536, and each block B is a controlled distribution copolymer block of at least one conjugated diene and at least one mono alkenyl arene, n is an integer from 2 to 30, and X is coupling agent residue, wherein the total amount of mono alkenyl arene in the block copolymer is between 15 and 50 percent by weight, and wherein the amount of mono alkenyl arene in each block B is between 10 and 45 percent by weight.

The weight ratio between the first and second block copolymer may be, but not limited to, 1:99 to 99:1, 20:80 to 80:20, 30:70 to 70:30, 40:60 to 60:40, or 50:50.

In another embodiment, the adhesive composition may contain more than two block copolymers.

The adhesive layer may be transparent, semi-transparent, or colored with any suitable colorants. The wavelength range which the adhesive layer absorbs may be preferably be adjusted by a known technique in the art.

The thickness of the adhesive layer may not be limited, but for instance may be in the range of around 1 micron to 100 microns.

The protection film may be prepared by a known technique such as a co-extrusion process and solvent coating process.

The solvent coating process may be carried out by dissolving pellets of the aforesaid adhesive composition into suitable solvent such as toluene; and applying the solvent on a base layer; and drying the solvent to solidify the adhesive composition to form an adhesive composition on the base layer.

The co-extrusion process may include feeding an adhesive composition to form the adhesive layer to a first extruder and feeding the substrate composition to form the substrate layer to a second extruder, melting the adhesive composition and the, substrate composition and conveying the substantially molten adhesive composition and substrate composition with the first and second extruder respectively, at the same time to a die in hydraulic communication with the first and second extruder and co-extruding a film comprising the adhesive layer and the substrate layer. The die may preferably be a multi-manifold die. The extrusion process downstream of the first and second extruder is typically a cast film process or a blown film process. Both processes are well known in the art and have been described in the Encyclopaedia of Chemical Technology (Kirk-Othmer), 1996, volume 19, in the chapter on plastic processing, pages 290-316, which pages are herein incorporated by reference.

EXAMPLES

Embodiments of the present invention will now be further illustrated with reference to the following examples, however, without restricting its scope to these embodiments.

Example 1

As Block copolymer A, S-EB-S styrenic block copolymer (poly(styrene) content: 21 wt %; EB block hydrogenation: >99%; vinyl content: 70 mol %; molecular weight (M.W.): 138 kg/mol; M.W. of poly(styrene) end block: 10 kg/mol) was prepared. The molecular weight was measured by GPC (HLC-8220 manufactured by TOSO), columns (manufactured by Waters), and tetrahydrofuran as solvent under the conditions of: temperature=45° C., flow rate=1.0 ml/min., sample concentration=0.1%, injected amount=20 micro-liter. The molecular weight was calculated by calibrating the resulted chromatograms with a standard curve using a standard polystyrene having a known molecular weight, and finding peak molecular weight from the calibrated chromatograms. As Tackifier F, YS Resin PX1150N (terpene resin manufactured by Yasuhara Chemical; SP value: 8.26; softening point: 115° C.) was provided. The combination of 100 weight parts of Block copolymer A, 20 weight parts of Tackifier F, and 0.2 weight part of a conventional antioxidant A was dissolved into toluene such that the solid content was 20%

A 50 microns-thick film of polyethylene terephthalate (PET) was provided as a base layer. The toluene solution was applied onto the base layer by a film coater (P1-1210 manufactured by TESTER SANGYO co., ltd.). The film was dried at 60° C. for 12 hours to obtain Example 1 of protection film. The thickness of the dried adhesive layer was around 10 microns.

Example 2

As Block copolymer C, $(S\text{-}EB)_nX$ styrenic block copolymer (poly(styrene) content: 13 wt %; EB block hydrogenation: >99%; vinyl content: 79 mol %; M.W.: 201 kg/mol; M.W. of poly(styrene) end block: 6 kg/mol) was prepared. As Tackifier A, YS Polyster G150 (terpene phenol resin manufactured by Yasuhara Chemical; SP value: 9.07; softening point: 150° C.) was provided. The combination of 100 weight parts of Block copolymer C, 5 weight parts of Tackifier A, and 0.2 weight part of conventional antioxidant A was subjected under the same process as Example 1 to obtain Example 2 of protection film.

Example 3

As Block copolymer B, $(S\text{-}EB)_nX$ styrenic block copolymer (poly(styrene) content: 18 wt %; EB block hydrogenation: >99%; vinyl content: 78 mol %; M.W.: 123 kg/mol; M.W. of poly(styrene) end block: 6 kg/mol; coupling efficiency: 95%) was prepared. As Tackifier B, YS Polyster S145 (terpene phenol resin manufactured by Yasuhara Chemical; SP value: 8.98; softening point: 145° C.) was provided. The combination of 100 weight parts of Block copolymer B, 1 weight part of Tackifier B, and 0.2 weight part of conventional antioxidant A was subjected under the same process as Example 1 to obtain Example 3 of protection film.

Example 4

As Tackifier D, YS Resin TO125 (aromatic-modified terpene resin manufactured by Yasuhara Chemical; SP value: 8.73; softening point: 125° C.) was provided. The combination of 50 weight parts of Block copolymer B, 50 weight parts of Block copolymer C, 10 weight parts of Tackifier D, and 0.2 weight part of conventional antioxidant A was subjected under the same process as Example 1 to obtain Example 4 of protection film.

Example 5

As Tackifier E, Arkon M135 (aliphatic cyclic partially-saturated hydrocarbon compound manufactured by Arakawa Chemical; SP value: 8.5; softening point: 135° C.) was provided. The combination of 70 weight parts of Block copolymer A, 30 weight parts of Block copolymer B, 15 weight parts of Tackifier E, and 0.2 weight part of conventional antioxidant A was subjected under the same process as Example 1 to obtain Example 5 of protection film.

Example 6

As referential Block copolymer F, SEBS copolymer of $(S\text{-}(S/EB))_nX$ (poly(styrene) content: 35 wt %; EB block hydrogenation: >99%; vinyl content: 69 mol %; M.W.: 138 kg/mol; M.W. of poly(styrene) end block: 7 kg/mol; coupling efficiency: 95%) was prepared. As Tackifier C, YS Polyster T160 (terpene phenol resin manufactured by Yasuhara Chemical; SP value: 8.81; softening point: 160° C.) was provided. The combination of 50 weight parts of Block copolymer F, 50 weight parts of Block copolymer C, 10 weight parts of Tackifier C, and 0.2 weight part of conventional antioxidant A was subjected under the same process as Example 1 to obtain Example 6 of protection film.

Comparative Example 7

As referential Tackifier H, YS Polyster K140 (terpene phenol resin manufactured by Yasuhara Chemical; SP value: 9.32; softening point: 140° C.) was provided. The combination of 100 weight parts of Block copolymer C, 5 weight parts of Tackifier H, and 0.2 weight part of conventional antioxidant A was subjected under the same process as Example 1 to obtain Example 7 of protection film.

Comparative Example 8

As referential Tackifier I, NEOTALL 125P (phenol-modified rosin manufactured by Harima Chemical; SP value: 7.76; softening point: 125° C.) was provided. The combination of 100 weight parts of Block copolymer B, 10 weight parts of Tackifier I, and 0.2 weight part of conventional antioxidant A was subjected under the same process as Example 1 to obtain Example 8 of protection film.

Comparative Example 9

As referential Tackifier G, Clearon P105 (hydrogenated terpene resin manufactured by Yasuhara Chemical; SP value: 8.36; softening point: 105° C.) was provided. The combination of 50 weight parts of Block copolymer B, 50 weight parts of Block copolymer C, 10 weight parts of Tackifier G, and 0.2 weight part of conventional antioxidant A was subjected under the same process as Example 1 to obtain Example 9 of protection film.

Comparative Example 10

The combination of 100 weight parts of Block copolymer A, and 0.2 weight part of conventional antioxidant A was subjected under the same process as Example 1 to obtain Example 10 of protection film. No tackifier was used.

Comparative Example 11

The combination of 100 weight parts of Block copolymer A, 0.1 weight part of Tackifier C, and 0.2 weight part of conventional antioxidant A was subjected under the same process as Example 1 to obtain Example 11 of protection film.

Comparative Example 12

The combination of 20 weight parts of Block copolymer B, 80 weight parts of Block copolymer C, 40 weight parts of Tackifier C, and 0.2 weight part of conventional antioxidant A was subjected under the same process as Example 1 to obtain Example 12 of protection film.

Comparative Example 13

The combination of 100 weight parts of Block copolymer B, 15 weight parts of Tackifier D, 10 weight parts of a plasticizer oil (*Diana* Process Oil manufactured by Idemitsu Kosan Co., Ltd.), and 0.2 weight part of conventional antioxidant A was subjected under the same process as Example 1 to obtain Example 13 of protection film.

Comparative Example 14

As referential Block copolymer D, S-EB-S styrenic block copolymer (poly(styrene) content: 30 wt %; EB block hydrogenation: >99%; vinyl content: 40 mol %; M.W.: 107 kg/mol; M.W. of poly(styrene) end block: 10 kg/mol) was prepared. The combination of 100 weight parts of Block copolymer D, 15 weight parts of Tackifier A, and 0.2 weight part of conventional antioxidant A was subjected under the same process as Example 1 to obtain Example 14 of protection film.

Comparative Example 15

As referential Block copolymer E, $(S\text{-}EB)_nX$ styrenic block copolymer (poly(styrene) content: 13 wt %; EB block hydrogenation: >99%; vinyl content: 44 mol %; M.W.: 145 kg/mol; M.W. of poly(styrene) end block: 5 kg/mol; coupling efficiency: 66%) was prepared. The combination of 100 weight parts of Block copolymer E, 15 weight parts of Tackifier F, and 0.2 weight part of conventional antioxidant A was subjected under the same process as Example 1 to obtain Example 15 of protection film.

The block copolymers used in the above examples are shown below.

TABLE 1

| Name | polymer structure | poly(styrene) content (%) | hydrogenation degree of EB block (%) | vinyl content (mol %) | molecular weight of blockcopolymer (kg/mol) | molecular weight of poly(styrene) end (kg/mol) | coupling efficiency (%) |
|---|---|---|---|---|---|---|---|
| Blockcopoymer A | S-EB-S | 21 | >99 | 70 | 138 | 10 | — |
| Blockcopoymer B | (S-EB)nX | 18 | >99 | 78 | 123 | 6 | 95 |
| Blockcopoymer C | (S-EB)nX | 13 | >99 | 79 | 201 | 6 | 95 |
| Blockcopoymer D | S-EB-S | 30 | >99 | 40 | 107 | 10 | — |
| Blockcopoymer E | (S-EB)nX | 13 | >99 | 44 | 145 | 5 | 66 |
| Blockcopoymer F | (S-(S/EB))nX | 35 | >99 | 69 | 138 | 7 | 95 |

The tackifiers used in the above and following examples are shown below.

TABLE 2

| Polar tackifier resin # | Tradename | Classes | SP value | Softening point (° C.) | Aromatic moieties |
|---|---|---|---|---|---|
| A | YS Polyster G150 | terpene phenol | 9.07 | 150 | Yes |
| B | YS Polyster S145 | terpene phenol | 8.98 | 145 | Yes |
| C | YS Polyster T160 | terpene phenol | 8.81 | 160 | Yes |
| D | YS Resin TO125 | aromatic-modified terpenen | 8.73 | 125 | Yes |
| E | Arkon M135 | aliphatic cyclic partally-saturated hydrocarbon | 8.5 | 135 | Yes |
| F | YS Resin PX1150N | terpene | 8.26 | 115 | no |
| G | Clearon P105 | hydrogenated terpene | 8.36 | 105 | no |
| H | YS Polyster K140 | terpene phenol | 9.32 | 140 | Yes |
| I | NEOTALL 125P | phenol-modified rosin | 7.76 | 125 | Yes |
| J | YS Polyster TH130 | terpene phenol | 8.81 | 130 | Yes |

<First Test Protocol>

The resulted films were cut into 25 mm wide specimens. The specimens were pressed onto a plate painted with alkyd melamine-based paint by a pressure rubber roller (manufactured by Toyo Seiki; speed: 50 mm/sec; 2 cycles; roller load: 2 kg). The pressed specimens were left at 23° C. and 50% humidity for 30 minutes.

The initial adhesion pressures of the specimens were measured as 180 degree peel strength by an autograph (AGS-J manufactured by Shimadzu; speed: 200 mm/minute).

13 to 15 lacked the initial adhesion strength, and comparative example 12 had disadvantageously built up its adhesion strength. Comparative examples 12 and 13 produced bad surface pollutions. Comparative example 12 was also poor in adhesive residue and zipping due to the disadvantageous adhesion after the treatment. Comparative example 13 was also poor in adhesive residue due to the disadvantageous low cohesion force.

TABLE 3

| | Example No.# | | | | | | | | | | | | | | |
|---|---|---|---|---|---|---|---|---|---|---|---|---|---|---|---|
| components (phr) | 1 | 2 | 3 | 4 | 5 | 6 | 7 | 8 | 9 | 10 | 11 | 12 | 13 | 14 | 15 |
| blockcopolymer A | 100 | | | | 70 | | | | | 100 | 100 | | | | |
| blockcopolymer B | | | 100 | 50 | 30 | | | 100 | 50 | | | 20 | 100 | | |
| blockcopolymer C | | 100 | | 50 | | 50 | 100 | | 50 | | | 80 | | | |
| blockcopolymer D | | | | | | | | | | | | | | 100 | |
| blockcopolymer E | | | | | | | | | | | | | | | 100 |
| blockcopolymer F | | | | | | 50 | | | | | | | | | |
| tackifier A | | 5 | | | | | | | | | | | | 15 | |
| tackifier B | | | 1 | | | | | | | | | | | | |
| tackifier C | | | | | | 10 | | | | | 0.1 | 40 | | | |
| tackifier D | | | | 10 | | | | | | | | | 15 | | |
| tackifier E | | | | | 15 | | | | | | | | | | |
| tackifier F | 20 | | | | | | | | | | | | | | 15 |
| tackifier G | | | | | | | | | 15 | | | | | | |
| tackifier H | | | | | | | 5 | | | | | | | | |
| tackifier I | | | | | | | | 10 | | | | | | | |
| plasticizer (PW-90) | | | | | | | | | | | | | 10 | | |
| antioxidant A | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| initial adhesion (N/25 mm) | 3.9 | 4.6 | 4.8 | 3.5 | 4.1 | 4.5 | 0.7 | 1.2 | 0.8 | 1.1 | 1.5 | 4.5 | 0.8 | 1.2 | 1.8 |
| adhesion after treatment (N/25 mm) | 5.7 | 5.3 | 5.5 | 5.1 | 5.8 | 5.5 | 2.2 | 2.1 | 3.5 | 0.8 | 1.7 | 16.3 | 1.2 | 2.5 | 4.8 |
| suppression of surface pollution | A | A | A | A | A | A | B | B | B | A | A | C | C | B | B |
| terminatation of adhesive redsidue | A | A | A | A | A | A | A | A | A | A | A | C | C | A | A |
| prevention of zipping | A | A | A | A | A | A | A | A | A | A | A | C | A | A | A |

The pressed specimens were heated at 70° C. for one week in a gear oven, and removed from the oven and further left at 23° C. and 50% humidity for 12 hours. The aged adhesion strength (180 degree peel strength) were measured by the same process as the initial adhesion strength.

In order to evaluate the surface pollution from the examples, the specimens were applied onto a painted plate with intentionally putting air bubbles between the film and the painted plate. The samples were heated at 70° C. for one week in a gear oven, and removed from the oven and further left at 23° C. and 50% humidity for 12 hours. The film were peeled off, and the surface of the plate was observed by eye. The results were judged according to the following standard: changing the angle of the plate with throwing visible light on the surface, finding no outlines of any air bubbles is "A"; finding some outlines at certain angle is "B"; and always finding their outlines at any angles is "C". In addition, the presences of adhesive residue and zipping were observed by eye. In the case that adhesive residue or zipping was observed, the film was judged as "C", otherwise "A".

Compositions and evaluation results of Examples 1 to 15 were shown in the below table. Examples 1 to 6 surprisingly had excellent initial adhesion strength, and little built-up of the adhesion strength such that they could advantageously suppress adhesion residue on the adherend object. The Examples also advantageously prevented surface pollution on the painted plate. The combination of good properties had been unexpected in the art.

In contrast, the comparative examples had defects in the properties. For instance, comparative examples 8 to 11 and Further examples were conducted under slightly different conditions such as additives.

Example 16

As Tackifier 3, YS Polyster TH130 (terpene phenol resin manufactured by Yasuhara Chemical; SP value: 8.81; softening point: 130° C.) was provided. The combination of 50 weight parts of Block copolymer B, 50 weight parts of Block copolymer C, 10 weight parts of Tackifier J, and 0.2 weight part of conventional antioxidant A was kneaded by a twin-screw extruder (240 rpm; material temperature: 180° C.; screw temperature: C1=140° C., C2=160° C., C3=180° C., C4=210° C., C5=220° C., C6=190° C., C7=150° C., die=140° C.). Then 0.2 weight part of a conventional dusting agent C was added to the kneaded mixture. The mixture was dissolved into toluene such that the solid content was 20%. A 50 microns-thick film of polyethylene terephthalate (PET) was provided as a base layer. The toluene solution was applied onto the base layer by a film coater (P1-1210 manufactured by TESTER SANGYO co., ltd.). The film was dried at 60° C. for 12 hours to obtain Example 16 of protection film. The thickness of the dried adhesive layer was around 10 microns.

Example 17

The combination of 40 weight parts of Block copolymer B, 60 weight parts of Block copolymer C, 5 weight parts of Tackifier J, 0.5 weight part of conventional antioxidant A and 0.5 weight part of conventional antioxidant B, and 0.2 weight part of conventional dusting agent C was subjected under the same process as Example 16 to obtain Example 17 of protection film.

Reference Example 18

The combination of 30 weight parts of Block copolymer A, 70 weight parts of Block copolymer F, 10 weight parts of Tackifier J, 0.5 weight part of antioxidant A and 1.0 weight part of antioxidant B, and 0.2 weight part of dusting agent C was subjected under the same process as Example 16 to obtain Example 18 of protection film.

Example 19

The combination of 80 weight parts of Block copolymer C, 20 weight parts of Block copolymer F, 10 weight parts of Tackifier 3, 0.2 weight part of antioxidant A, and 0.2 weight part of dusting agent C was subjected under the same process as Example 16 to obtain Example 19 of protection film.

Comparative Example 20

The combination of 70 weight parts of Block copolymer A, 30 weight parts of Block copolymer B, 50 weight parts of Tackifier 3, 0.5 weight part of antioxidant A and 1.0 weight part of antioxidant B, and 0.6 weight part of dusting agent C was subjected under the same process as Example 16 to obtain Example 20 of protection film.

Comparative Example 21

The combination of 100 weight parts of Block copolymer E, 10 weight parts of Tackifier 3, 0.5 weight part of antioxidant A and 1.0 weight part of antioxidant B, and 0.2 weight part of dusting agent C was subjected under the same process as Example 16 to obtain Example 21 of protection film.

<Second Test Protocol>

The resulted films were cut into 25 mm wide specimens. The specimens were pressed onto a plate painted with alkyd melamine-based paint by a pressure rubber roller (manufactured by Toyo Seiki; speed: 50 mm/sec; 2 cycles; roller load: 2 kg). The pressed specimens were left at 23° C. and 50% humidity for 24 hours.

The initial adhesion pressures of the specimens were measured as 180 degree peel strength by an autograph (AGS-3 manufactured by Shimadzu; speed: 200 mm/minute).

The pressed specimens were heated at 70° C. for 1 week in a gear oven, and removed from the oven and further left at 23° C. and 50% humidity for 24 hours. The aged adhesion strength (180 degree peel strength) were measured by the same process as the initial adhesion strength.

In order to evaluate the surface pollution from the examples, the specimens were applied onto a painted plate with intentionally putting air bubbles between the film and the painted plate. The samples were heated at 70° C. for one week in a gear oven, and removed from the oven and further left at 23° C. and 50% humidity for 12 hours. The film were peeled off, and the surface of the plate was observed by eye. The results were judged according to the following standard: changing the angle of the plate with throwing visible light on the surface, finding no outlines of any air bubbles is "A"; finding some outlines at certain angle is "B"; and always finding their outlines at any angles is "C".

The peeled films were also observed by eye to confirm whether they had an adhesive residue and a zipping on the adherend object or not. If an adhesive residue and zipping were observed, the film was evaluated as "C", respectively; otherwise as "A". Note that a zipping is a phenomenon that peel strengths over a sealed portion are considerably uneven. The zipping would lead to surface pollution.

Compositions and evaluation results of Examples 16 to 21 were shown in the below table. Especially, Examples 16 to 17 surprisingly had excellent initial adhesion strength, and little built-up of the adhesion strength such that they could advantageously suppress adhesion residue on the adherend object. The Examples also advantageously prevented surface pollution on the painted plate and produced no zipping. The combination of good properties had been unexpected in the art.

In contrast, the comparative examples were inferior in any of properties. In brief, comparative example 21 generally lacked adhesion strength. Comparative example 20 was bad in surface pollution and zipping.

TABLE 4

| | Example No.# | | | | | |
|---|---|---|---|---|---|---|
| components (phr) | 16 | 17 | 18 | 19 | 20 | 21 |
| blockcopolymer A | | | 30 | | 70 | |
| blockcopolymer B | 50 | 40 | | | 30 | |
| blockcopolymer C | 50 | 60 | | 80 | | |
| blockcopolymer E | | | | | | 100 |
| blockcopolymer F | | | 70 | 20 | | |
| tackifier J | 10 | 5 | 10 | 10 | 50 | 10 |
| antioxidant A | 0.2 | 0.5 | 0.5 | 0.2 | 0.5 | 0.5 |
| antioxidant B | | 0.5 | 1.0 | | 1.0 | 1.0 |
| dusting agent C | 0.2 | 0.2 | 0.2 | 0.2 | 0.6 | 0.2 |
| initial adhesion (N/25 mm) | 4.4 | 3.8 | 4.5 | 4.3 | 4.8 | 0.4 |
| adhesion after treatment (N/25 mm) | 4.9 | 4.0 | 4.6 | 4.5 | 9.9 | 0.8 |
| suppression of surface pollution | A | A | A | A | C | A |
| terminatation of adhesive redsidue | A | A | A | A | C | A |
| prevention of zipping | A | A | A | A | C | A |

Further examples were conducted by a co-extrusion process.

Example 22

The combination of 50 weight parts of Block copolymer B, 50 weight parts of Block copolymer C, 10 weight parts of Tackifier 3, and 0.2 weight part of antioxidant A was put into a twin-screw extruder (240 rpm; material temperature: 180° C.; screw temperature: C1=140° C., C2=160° C., C3=180° C., C4=210° C., C5=220° C., C6=190° C., C7=150° C., die=140° C.). Then 0.2 weight part of a conventional dusting agent C was added to the kneaded mixture to obtain an adhesive compound.

The adhesive compound as an adhesive layer and low-density polyethylene (LD105 manufactured by Exxon Mobil) as a base layer were co-extruded by a co-extrusion apparatus with a multi-manifold die (manufactured by Killion; die temperature: 232° C.) to obtain Example 22 of protection film. The thicknesses of the adhesive and base layers were 25 microns and 51 microns, respectively.

Example 23

The combination of 50 weight parts of Block copolymer C, 50 weight parts of Block copolymer F, 10 weight parts of Tackifier 3, 0.2 weight part of antioxidant A, and 0.2 weight part of dusting agent C was subjected under the same process as Example 22 to obtain Example 23 of protection film.

<Third Test Protocol>

The resulted films were cut into 25 mm wide specimens. The specimens were pressed onto a plate painted with alkyd melamine-based paint by a pressure rubber roller (manufactured by Toyo Seiki; speed: 50 mm/sec; 2 cycles; roller load: 2 kg). The pressed specimens were left at 23° C. and 50% humidity for 24 hours.

The initial adhesion pressures of the specimens were measured as 180 degree peel strength by an autograph (AGS-J manufactured by Shimadzu; speed: 200 mm/minute).

The pressed specimens were heated at 70° C. for 1 week in a gear oven, and removed from the oven and further left at 23° C. and 50% humidity for 24 hours. The aged adhesion strength (180 degree peel strength) were measured by the same process as the initial adhesion strength.

In order to evaluate the surface pollution from the examples, the specimens were applied onto a painted plate with intentionally putting air bubbles between the film and the painted plate. The samples were heated at 70° C. for one week in a gear oven, and removed from the oven and further left at 23° C. and 50% humidity for 12 hours. The film were peeled off, and the surface of the plate was observed by eye. The results were judged according to the following standard: changing the angle of the plate with throwing visible light on the surface, finding no outlines of any air bubbles is "A"; finding some outlines at certain angle is "B"; and always finding their outlines at any angles is "C".

The peeled films were also observed by eye to confirm whether they had an adhesive residue and a zipping on the adherend object or not. If an adhesive residue and zipping were observed, the film was evaluated as "C", respectively; otherwise as "A".

Compositions and evaluation results of Examples 22 to 23 were shown in the below table. Examples 22 and 23 were excellent in the all tested properties.

TABLE 5

| components (phr) | Example No. # 22 | 23 |
|---|---|---|
| blockcopolymer B | 50 | |
| blockcopolymer C | 50 | 50 |
| blockcopolymer F | | 50 |
| tackifier J | 10 | 10 |
| antioxidant A | 0.2 | 0.2 |
| dusting agent C | 0.2 | 0.2 |
| initial adhesion (N/25 mm) | 4.0 | 4.1 |
| adhesion after treatment (N/25 mm) | 5.4 | 5.3 |
| suppression of surface pollution | A | A |
| terminatation of adhesive redsidue | A | A |
| prevention of zipping | A | A |

The aforesaid embodiments can solve the problems above and protect a painting surface without excessive production and running costs.

<Additional Notes>

<Note 1>

An adhesive composition for a protective film on a painting, comprising:

100 weight parts of block copolymer having the formula of S-EB-S or $(\text{S-EB})_n$X; and 1 to 20 weight parts of a polar tackifier resin compound, wherein the adhesive composition is substantially free of a plasticizer oil, wherein each S of the formula is independently a polymer block of predominantly styrene, EB is a hydrogenated polymer block of predominantly butadiene, n is an integer equal to or greater than 2, and X is the residue of a coupling agent, wherein the block copolymer includes 13 to 21 wt % of poly(styrene) content, wherein the EB block of the block copolymer has hydrogenation degree of at least 80%, wherein the poly(butadiene) block precursor of the block copolymer has a vinyl content in the range of from 60 to 85 mol %, wherein the polar tackifier resin compound has a solubility parameter (SP value) of 8.2 to 9.2 calculated by the Small method using Hoy's constant, and wherein the tackifier resin compound has a softening point equal to or greater than 110° C. as determined by the Ring and Ball method (ASTM E-28).

<Note 2>

The adhesive composition according to Note 1, comprising 1 to 10 weight parts of the tackifier resin compound.

<Note 3>

The adhesive composition according to Notes 1 or 2, wherein the SP value of the polar tackifier resin compound is in the range of 8.5 to 9.1.

<Note 4>

The adhesive composition according to any one of Notes 1 to 3, wherein the tackifier resin compound is terpenoid or a derivative thereof.

<Note 5>

The adhesive composition according to any one of Notes 1 to 3 wherein the tackifier resin compound is an aliphatic cyclic compound.

<Note 6>

A protective film configured to stick on a painting, comprising: a base material; and the adhesive composition according to any one of Notes 1 to 5.

<Note 7>

A process for manufacturing an adhesive composition in a form of pellet for a protective film on a painting, the process comprising the steps of:

dry-blending 100 weight parts of a block copolymer having the formula of S-EB-S or $(\text{S-EB})_n$X with 1 to 20 weight parts of a polar tackifier resin compound to obtain a dry-blend without substantially using a plasticizer oil;

extruding the dry-blend in an extruder to obtain an extrudate;

pelletizing the extrudate with an underwater pelletizer to obtain wet pellets; and drying the wet pellets to obtain pellets containing the adhesive composition, wherein the adhesive composition is substantially free of a plasticizer oil, wherein each S of the formula is independently a polymer block of predominantly styrene, EB is a hydrogenated polymer block of predominantly butadiene, n is an integer equal to or greater than 2, and X is the residue of a coupling agent, wherein the block copolymer includes 13 to 21 wt % of poly(styrene) content, wherein the EB block of the block copolymer has hydrogenation degree of at least 80%, wherein the poly(butadiene) block precursor of the block copolymer has a vinyl content in the range of from 60 to 85 mol %, wherein the polar tackifier resin compound has a solubility parameter (SP value) of 8.2 to 9.2 calculated by the Small method using Hoy's constant, and wherein the tackifier resin compound has a softening point equal to or greater than 110° C. as determined by the Ring and Ball method (ASTM E-28).

<Note 8>

A use of the adhesive composition according to any one of Notes 1 to 5 for preventing a surface pollution on a painting, the use comprising the steps of:

providing an article having a painting;

providing a sheet having a base layer;

forming an adhesive layer on the base layer by applying on the base layer the adhesive composition according to any one of Notes 1 to 5; and pasting the sheet onto the painting.

DESCRIPTION OF THE REFERENCE NUMERALS

100—substrate
102—painting surface
110—base layer of protection film
112—adhesive layer of protection film
120—thermal expansion
122—wrinkled portion of protection film
124—stress yielding points of protection film
130—convexity formed by physical deformation
132—concavity formed by physical deformation
140—molecular mobilization by chemical interaction
150—cave made by chemical interaction
152—additional line to show where adhesive layer was attached to
154—bulge made by chemical interaction

The invention claimed is:

1. An adhesive composition for a protective film on a painting, comprising:

100 weight parts of block copolymer having the formula of S-EB-S or (S-EB)nX; and 1 to 20 weight parts of a polar tackifier resin compound, wherein the adhesive composition is substantially free of a plasticizer oil, wherein each S of the formula is independently a polymer block of predominantly styrene, EB is a hydrogenated polymer block of predominantly butadiene, n is an integer equal to or greater than 2, and X is the residue of a coupling agent, wherein the block copolymer includes 13 to 21 wt % of poly(styrene) content, wherein the EB block of the block copolymer has hydrogenation degree of at least 80%, wherein the poly(butadiene) block precursor of the block copolymer has a vinyl content in the range of from 60 to 85 mol %, wherein the polar tackifier resin compound has a solubility parameter (SP value) of 8.2 to 9.2 calculated by the Small method using Hoy's constant, wherein the polar tackifier resin compound is selected from the group consisting of terpene resin, terpene phenol resin, hydrogenated terpene resin, aromatic-modified terpene resin, and aliphatic cyclic partially saturated hydrocarbon compounds, and wherein the tackifier resin compound has a softening point equal to or greater than 110° C. as determined by the Ring and Ball method (ASTM E-28).

2. The adhesive composition according to claim 1, comprising 1 to 15 weight parts of the tackifier resin compound.

3. The adhesive composition according to claim 2, comprising 1 to 10 weight parts of the tackifier resin compound.

4. The adhesive composition according to claim 1, wherein the SP value of the polar tackifier resin compound is in the range of 8.5 to 9.1.

5. The adhesive composition according to claim 4, wherein the SP value of the polar tackifier resin compound is in the range of 8.8 to 9.1.

6. The adhesive composition according to claim 1, comprising 1 to 5 weight parts of the tackifier resin compound.

7. The adhesive composition according to claim 1, wherein the tackifier resin compound has a softening point equal to or greater than 130° C.

8. The adhesive composition according to any one of claims 1 to 7, wherein the tackifier resin compound is cyclic.

9. The adhesive composition according to claim 8, wherein the tackifier resin compound has an aromatic moiety.

10. The adhesive composition according to claim 9, wherein the tackifier resin A compound is selected from the group consisting of terpene resin, terpene phenol resin, hydrogenated terpene resin, and aromatic-modified terpene resin.

11. The adhesive composition according to claim 1, wherein the tackifier resin compound is terpene phenol resin.

12. The adhesive composition according to claim 1, wherein the tackifier resin compound is an aliphatic cyclic partially-saturated hydrocarbon compound.

13. The adhesive composition according to claim 1, wherein the block copolymer has poly(styrene) end block content of 13 to 21 wt %.

14. The adhesive composition according to claim 1, wherein the block copolymer has a nominal molecular weight of equal to or greater than 100,000 g/mol as styrene equivalent peak molecular weight according to ASTM 3536.

15. The adhesive composition according to claim 1, wherein the poly(styrene) end block of the block copolymer has a molecular weight of equal to or greater than 5,000 g/mol as styrene equivalent peak molecular weight according to ASTM 3536.

16. The adhesive composition according to claim 15, wherein the poly(styrene) end block of the block copolymer has a molecular weight of 5,000 to 12,000 g/mol as styrene equivalent peak molecular weight according to ASTM 3536.

17. The adhesive composition according to claim 1, wherein the coupling efficiency of the block copolymer is equal to or more than 95%.

18. The adhesive composition according to claim 1, further comprising up to 5 weight parts of an antioxidant.

19. A protective film configured to stick on a painting, comprising:

a base material; and the adhesive composition according to claim 1.

20. A protective film configured to stick on a painting, comprising:

a base layer; and an adhesive layer including an adhesive composition, the adhesive composition including:

100 weight parts of block copolymer having the formula of S-EB-S or (S-EB)nX; and 1 to 20 weight parts of a polar tackifier resin compound, wherein the adhesive composition is substantially free of a plasticizer oil, wherein each S of the formula is independently a polymer block of predominantly styrene, EB is a hydrogenated polymer block of predominantly butadiene, n is an integer equal to or greater than 2, and X is the residue of a coupling agent, wherein the block copolymer includes 13 to 21 wt % of poly(styrene) content, wherein the EB block of the block copolymer has hydrogenation degree of at least 80%, wherein the poly(butadiene) block precursor of the block copolymer has a vinyl content in the range of from 60 to 85 mol %, wherein the polar tackifier resin compound has a solubility parameter (SP value) of 8.2 to 9.2 calculated by the Small method using Hoy's constant, wherein the polar tackifier resin compound is selected from the group consisting of terpene resin, terpene phenol resin, hydrogenated terpene resin, aromatic-modified terpene resin, and aliphatic cyclic partially saturated hydrocarbon compounds, and wherein the tackifier resin compound has a softening point equal to or greater than 110° C. as determined by the Ring and Ball method (ASTM E-28).

21. The protective film according to claim 19 or 20, wherein the film is prepared by a co-extrusion.

22. The protective film according to claim 20, wherein the film is prepared by solvent coating.

23. An article having a painting protected by the protective film according to claim 20.

24. The article according to claim 23, wherein the article is an automobile.

25. A process for manufacturing an adhesive composition in a form of pellet for a protective film on a painting, the process comprising the steps of:

dry-blending 100 weight parts of a block copolymer having the formula of S-EB-S or (S-EB)nX with 1 to 20 weight parts of a polar tackifier resin compound to obtain a dry-blend without substantially using a plasticizer oil;

extruding the dry-blend in an extruder to obtain an extrudate;

pelletizing the extrudate with an underwater pelletizer to obtain wet pellets; and drying the wet pellets to obtain pellets containing the adhesive composition, wherein the adhesive composition is substantially free of a plasticizer oil, wherein each S of the formula is independently a polymer block of predominantly styrene, EB is a hydrogenated polymer block of predominantly butadiene, n is an integer equal to or greater than 2, and X is the residue of a coupling agent, wherein the block copolymer includes 13 to 21 wt % of poly(styrene) content, wherein the EB block of the block copolymer has hydrogenation degree of at least 80%, wherein the poly(butadiene) block precursor of the block copolymer has a vinyl content in the range of from 60 to 85 mol %, wherein the polar tackifier resin compound has a solubility parameter (SP value) of 8.2 to 9.2 calculated by the Small method using Hoy's constant, wherein the polar tackifier resin compound is selected from the group consisting of terpene resin, terpene phenol resin, hydrogenated terpene resin, aromatic-modified terpene resin, and aliphatic cyclic partially saturated hydrocarbon compounds, and wherein the tackifier resin compound has a softening point equal to or greater than 110° C. as determined by the Ring and Ball method (ASTM E-28).

26. The process according to claim 25, further comprising the step of:

treating the wet or dry pellets with a dusting agent in an amount of 0.1 to 10% by weight of the total composition.

27. A method for preventing a surface pollution on a painting, comprising the steps of:

providing an article having a painting;

providing a sheet having a base layer;

forming an adhesive layer on the base layer by applying on the base layer the adhesive composition according to any one of claims 1-9, 10, 11, and 12-26; and pasting the sheet onto the painting.

28. The method according to claim 27, wherein a surface pollution is prevented for at least seven days at 70° C.

* * * * *